US 6,719,028 B2

(12) United States Patent
D'Amico et al.

(10) Patent No.: US 6,719,028 B2
(45) Date of Patent: Apr. 13, 2004

(54) WHEEL END ASSEMBLY WITH SPINDLE SLEEVE

(75) Inventors: Anthony T. D'Amico, Troy, MI (US); Daniel G. Chien, Franklin, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 10/080,838

(22) Filed: Feb. 22, 2002

(65) Prior Publication Data

US 2002/0112802 A1 Aug. 22, 2002

Related U.S. Application Data

(60) Provisional application No. 60/270,653, filed on Feb. 22, 2001.

(51) Int. Cl.⁷ .................. B60C 23/10; B60C 29/00; B60K 17/04; B60B 27/00
(52) U.S. Cl. .................. 152/415; 152/416; 180/372; 180/385; 301/105.1
(58) Field of Search .................. 301/105.1; 152/415, 152/416, 417; 180/255, 371, 372, 374, 385

(56) References Cited

U.S. PATENT DOCUMENTS

| 2,529,330 | A | * | 11/1950 | Double | 475/337 |
|---|---|---|---|---|---|
| 2,543,811 | A | * | 3/1951 | Snow et al. | 475/346 |
| 5,080,156 | A | * | 1/1992 | Bartos | 152/417 |
| 5,190,355 | A | * | 3/1993 | Hobbie et al. | 301/105.1 |
| 6,017,097 | A | * | 1/2000 | Weir, III | 301/105.1 |
| 6,182,727 | B1 | * | 2/2001 | Beesley | 152/417 |
| 6,325,123 | B1 | * | 12/2001 | Gao et al. | 152/416 |
| 6,363,985 | B1 | * | 4/2002 | Beesley | 152/417 |
| 6,422,369 | B1 | * | 7/2002 | McCalla | 192/69.41 |

* cited by examiner

Primary Examiner—S. Joseph Morano
Assistant Examiner—Jason R. Bellinger
(74) Attorney, Agent, or Firm—Carlson, Gaskey & Olds

(57) ABSTRACT

A vehicle wheel end assembly includes a sleeve member that allows air to be vented from the wheel end while significantly reducing venting of lubricating fluid. The wheel end includes a hub that is driven by a gear assembly. Lubricating fluid is stored within the hub to lubricate the gear assembly. Air pressure that builds up within the wheel end during vehicle operation is vented from the wheel end assembly via a vent path. A sleeve is installed within the wheel end to block the lubricating fluid from entering the vent path.

20 Claims, 3 Drawing Sheets

WHEEL END ASSEMBLY WITH SPINDLE SLEEVE

CROSS-REFERENCE TO RELATED APPLICATIONS

The application claims priority to U.S. Provisional Application No. 60/270,653, which was filed on Feb. 22, 2001.

BACKGROUND OF THE INVENTION

This invention generally relates to a method and apparatus for venting air from a wheel end assembly.

Vehicle wheel end assemblies experience air pressure build-up within the wheel end during vehicle operation, which is undesirable. This air pressure is vented from the wheel end via an outlet. Air pressure build-up can occur within a wheel for various reasons.

For example, air pressure can build up within a wheel end for a vehicle having a central tire inflation system (CTIS). CTIS are typically connected to multiple wheel ends on a vehicle to maintain a desired optimal tire pressure at each wheel end during vehicle operation. The CTIS provides a separate air supply, or utilizes an existing air supply on the vehicle, which is connected to each tire. During vehicle operation, the pressure in each tire is monitored and when the tire pressure falls below a predetermined optimal pressure, the CTIS supplies air to inflate the tire back up to the optimal tire pressure. The CTIS includes multiple seals at each wheel end to provide a sealed system that allows air to be transferred from a stationary source on the vehicle to a rotating wheel component.

Each wheel end includes oil or other similar fluid that lubricates wheel end components to prevent component wear and overheating. A certain level of fluid needs to be maintained in each wheel end to provide sufficient lubrication. During vehicle operation, CTIS seal leaks cause air pressure to build up in the wheel end assembly, which is undesirable.

Air pressure build-up can also occur in wheel end assemblies for vehicles that do not include CTIS. For example, temperature increases within the wheel end assembly, due to vehicle braking operations, can cause air pressure to be built up within the wheel end. Also, the churning of the lubrication fluid within the wheel end assembly from a bearing and/or wheel end gear assembly can cause pressure build-up.

This air pressure is vented from the wheel end assembly via an outlet port. In current wheel end configurations, as the air is vented, some of the wheel end lubricating fluid is also vented out through the same outlet port. This causes lubrication fluid levels within the wheel end to decrease over time, resulting in potential premature component wear.

Thus, it is desirable to have a vehicle wheel end assembly that is capable of venting air pressure from the wheel end while maintaining sufficient levels of lubricating fluid, as well as overcoming the other above mentioned deficiencies with the prior art.

SUMMARY OF THE INVENTION

A vehicle wheel end assembly includes a blocking member that reduces the amount of lubricating fluid in a wheel end assembly that is vented from the wheel end during exhaustion of air via a vent path. The blocking member is positioned within the wheel end to limit the amount of lubrication fluid that enters the vent path.

In the preferred embodiment, the wheel end assembly includes a wheel hub and a wheel end gear assembly in driving engagement with the wheel hub. A fluid chamber, formed within the wheel hub, defines a fluid path in communication with the wheel end gear assembly to provide lubricating fluid to the wheel end gear assembly. A vent path extends from the wheel end gear assembly, through the wheel hub to an outlet for venting air from the wheel end. The blocking member is positioned within the wheel hub to at least partially block the fluid path to reduce the amount of lubricating fluid that enters the vent path as air is vented from the vent path via the outlet.

In a disclosed embodiment, the wheel end includes a spindle that is mounted to an axle housing. The spindle has a bore that extends through the center of the spindle. The wheel hub is supported on the spindle via at least one bearing for rotation relative to the spindle. An axle shaft is mounted within the spindle bore for providing driving torque to the wheel hub. The wheel end gear assembly reacts between the wheel hub and the axle shaft to transfer driving torque from the axle shaft to the wheel hub. The vent path is defined within the hub and extends at least from the gear assembly through the bore to the outlet. The blocking member extends outwardly from one end of the spindle to at least partially block the fluid path to reduce the amount of lubricating fluid that enters the vent path as air is vented from the outlet.

Preferably, the blocking member is a cylindrical sleeve that has an outer surface and an inner surface. The outer surface is in engagement with the inner bore of the spindle. The axle shaft extends through the center of the sleeve and is spaced from the inner surface to define a gap that forms a portion of the vent path. The sleeve extends outwardly from one end of the spindle such that the outer surface blocks a portion of the fluid path.

The subject invention allows air to be easily vented from the wheel end while still maintaining sufficient lubrication levels within the wheel end assembly. These and other features of the present invention can be best understood from the following specifications and drawings, the following of which is a brief description.

DETAILED DESCRIPTION OF A PREFERRED EMBODIMENT

The subject invention relates to a vehicle wheel end assembly that experiences air pressure build-up. The wheel end assembly can be any type of wheel end assembly known in the art. The Figures depict a wheel end assembly as used in a vehicle having a central tire inflation assembly (CTIS). There are many different types of central tire inflation systems. It should be understood that the subject invention could be used on a wheel end for a vehicle using any of these various central tire inflation systems. The operation of CTIS is well known in the art and will not be discussed in detail. While a wheel end assembly as used in a vehicle having CTIS is shown, it should be understood that the subject invention could also be used in wheel end assemblies for vehicles that do not have CTIS.

Figure 1:
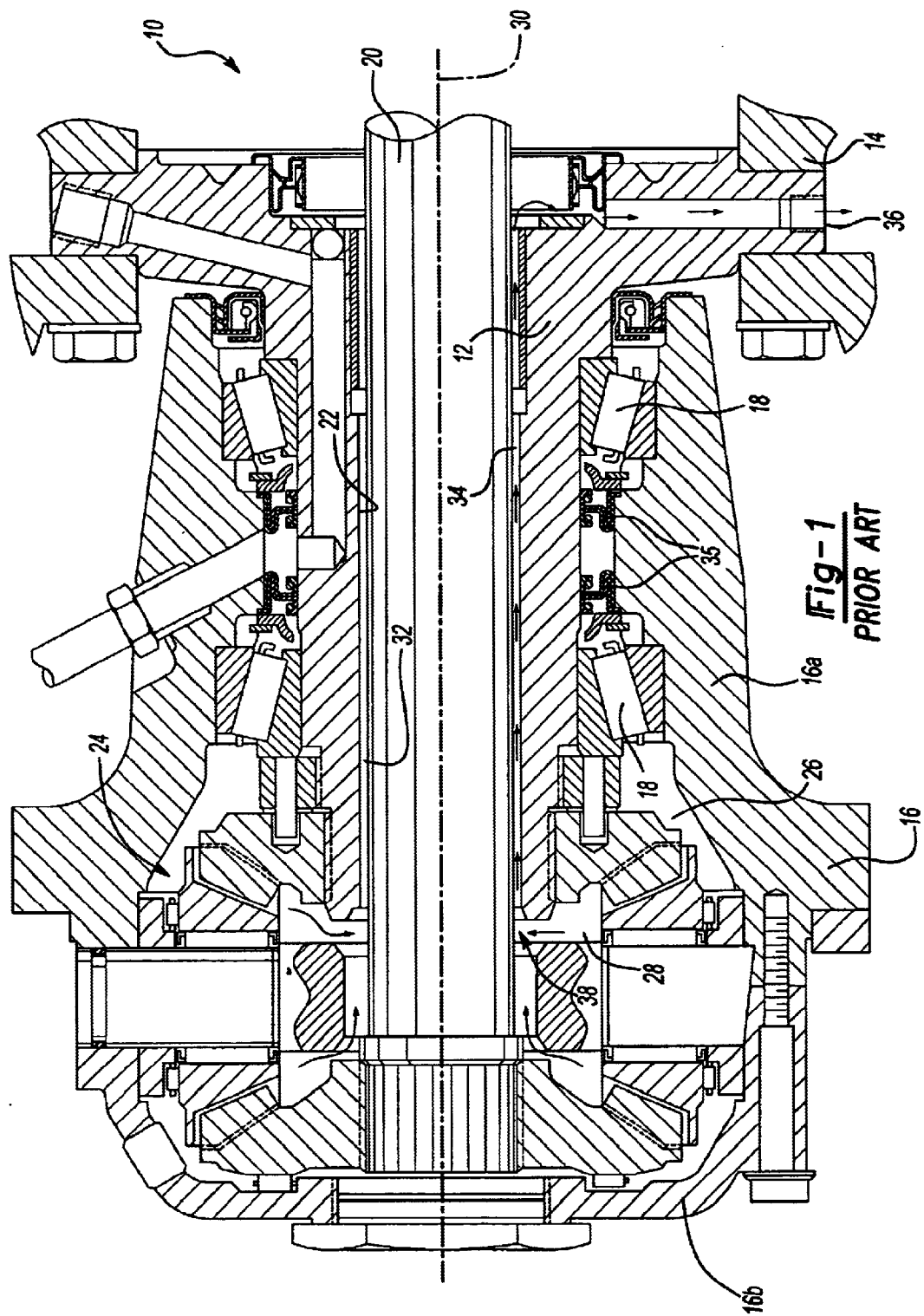
FIG. 1 is a cross-sectional view, partially broken away, of a prior art wheel end assembly.

A wheel end assembly 10, designed according to the prior art, is shown in FIG. 1. The wheel end assembly includes a spindle 12 that is mounted to a non-rotating axle component, such as an axle housing 14. The axle housing 14 is mounted to a vehicle structure or suspension component as is known in the art. A wheel hub 16 is supported on a bearing assembly 18 for rotation relative to the spindle 12. The hub 16 includes a main portion 16a and a cover portion 16b. A rim and tire assembly (not shown) is mounted to the wheel hub 16 as is known in the art.

An axle shaft 20 extends through a bore 22 formed within the spindle 12 to provide driving torque to the wheel hub 16. The axle shaft 20 receives torque input from a vehicle engine/transmission (not shown). The bore 22 is centrally formed within the spindle 12 and extends through the length of the spindle 12.

The axle shaft 22 drives a wheel end gear assembly 24 that is operably coupled to the wheel hub 16. A chamber 26 is formed within the hub 16, which includes a lubricating fluid for the wheel end components, such as the gear assembly 24 and bearing assembly 18. The chamber 26 defines a fluid path 28 that extends to the components in the gear assembly 24. The chamber 26 is formed within the body portion 16a of the hub 16 and is enclosed by the cover portion 16b.

The axle shaft 20 rotates within the bore 22, relative to the spindle 12, about an axis of rotation 30. The axle shaft 20 is spaced apart from an inner surface of the bore 22 such that a gap 32 is formed between the axle shaft 20 and the spindle 12. The gap 32 forms a portion of a vent path 34 that extends from the gear assembly 24, through the spindle 12, and to an outlet 36.

In the prior art wheel end assembly 10 of FIG. 1, the fluid path 28 and the vent path 34 have a common path portion, generally indicated at 38. During vehicle operation, as wheel end seals 35 of the CTIS leak or as temperature increases, air pressure builds up within the wheel end 10. This air is vented at the outlet 36 via the vent path 34. The outlet 36 is typically at the axle housing 14. During venting, some of the lubricating fluid from the chamber 26 enters the vent path 34 at the common path portion 36 and is vented from the wheel end 10. This decreases lubrication levels within the wheel end 10, which may result in premature component wear.

Figure 2:
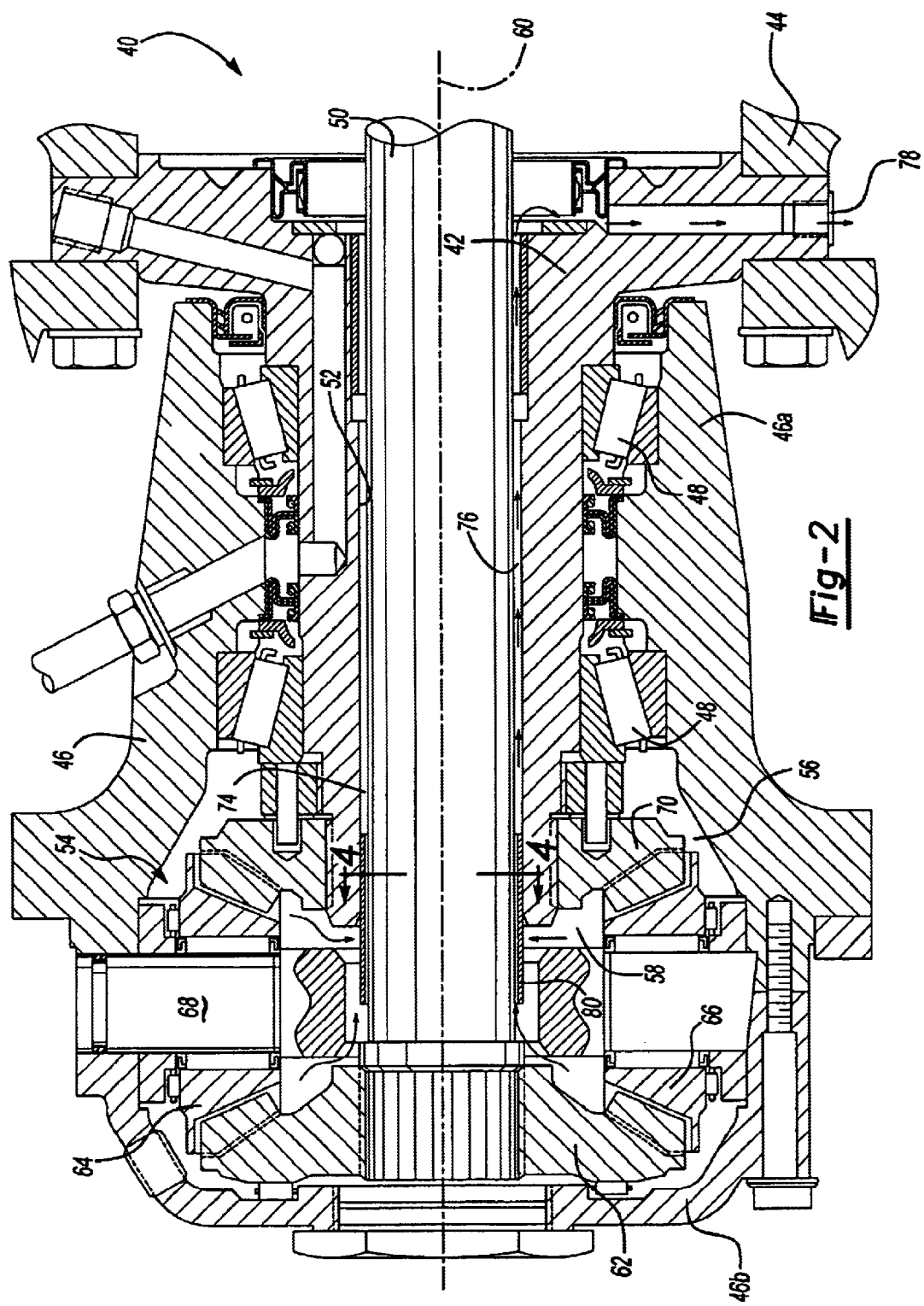
FIG. 2 is a cross-sectional view, partially broken away, of a wheel end incorporating the subject invention

A wheel end assembly, including the subject invention, is shown generally at 40 in FIG. 2. The wheel end assembly 40 includes a spindle 42 that is mounted to a non-rotating axle component, such as an axle housing 44. The axle housing 44 is mounted to a vehicle structure or suspension component as discussed above. A wheel hub 46 is supported on a bearing assembly 48 for rotation relative to the spindle 42. The hub 46 includes a main body portion 46a and a cover portion 46b. A rim and tire assembly (not shown) is mounted to the wheel hub 46 as discussed above.

An axle shaft 50 extends through a bore 52 formed within the spindle 42 to provide driving torque to the wheel hub 46. The axle shaft 50 receives torque input from a vehicle engine/transmission (not shown). The bore 52 is centrally formed within the spindle 42 and extends through the length of the spindle 42.

The axle shaft 50 drives a wheel end gear assembly 54 that is operably coupled to the wheel hub 46. A chamber 56 is formed within the hub 46, which includes a lubricating fluid for the wheel end components, such as the gear assembly 54 and bearing assembly 48. The chamber 56 defines a fluid path 58 that extends to the components in the gear assembly 54. The chamber 56 is formed within the body portion 46a and is enclosed by the cover portion 46b.

The axle shaft 50 rotates within the bore 52, relative to the spindle 42, about an axis of rotation 60. As described above, the axle shaft 50 is operably coupled to the wheel end gear assembly 54. In the embodiment shown in FIG. 2, the wheel end gear assembly 54 includes a first gear 62 splined to one end of the axle shaft 50. The first gear 62 is in meshing engagement with second 64 and third 66 gears supported on a wheel end cross member 68. The second 64 and third 66 gears are in meshing engagement with a fourth gear 70 that is splined to the spindle 42. The axle shaft 50 drives the first gear 62, which reacts with the second 64, third 66, and fourth 70 gears to drive the wheel hub 46. It should be understood that this specific gear configuration is used as an example of one gear configuration embodiment, and that the subject invention could be used with other types of gear assembly configurations.

The lubricating fluid in the chamber 56 flows along the fluid path 58 to lubricate the various components of the gear assembly 54. The axle shaft 50 is spaced apart from an inner surface of the bore 52 such that a gap 74 is formed between the axle shaft 50 and the spindle 42. The gap 74 forms a portion of a vent path 76 that extends from the gear assembly 54, through the spindle 42, and to an outlet 78. Preferably, the outlet 78 vents to the axle housing 44, however, the outlet 78 could also be to atmosphere.

To reduce the venting of lubricating fluid from the wheel end 40, a blocking member 80 is used to block at least a portion of the fluid path 58 to reduce the amount of lubricating fluid that enters the vent path 76. Preferably, the blocking member 80 is supported by the spindle 42 and extends beyond an end face of the spindle 42 at the mouth of the bore 52 to block the fluid path 58. Preferably, blocking member 80 extends into the gear assembly 54 to block the fluid path 58. As shown in FIG. 2, the blocking member 80 extends into a bore in the cross member 68.

Figure 3:
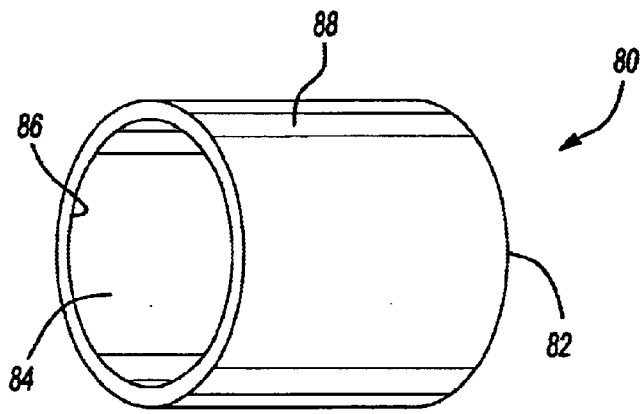
FIG. 3 is a perspective view of the blocking member of FIG. 2.

As shown in FIG. 3, the blocking member 80 is preferably a cylindrical sleeve 82 that includes a central bore 84 having an inner bore surface 86. Preferably, an outer surface 88 of the sleeve 82 is inserted within the bore 52 in the spindle 42 to engage the spindle bore surface. The sleeve 82 can be press-fit into the bore 52, threaded into the bore 52, snapped onto the end of the spindle 42, or attached by other similar means known in the art. Additionally, the sleeve 82 could also be inserted over the end of the spindle 42. The sleeve 82 could be made from steel, plastic, or any suitable material known in the art that can withstand the temperatures and fluid environment within the wheel end 40. Optionally, the sleeve 82 could be formed as an integral part of the spindle 42.

Figure 4:
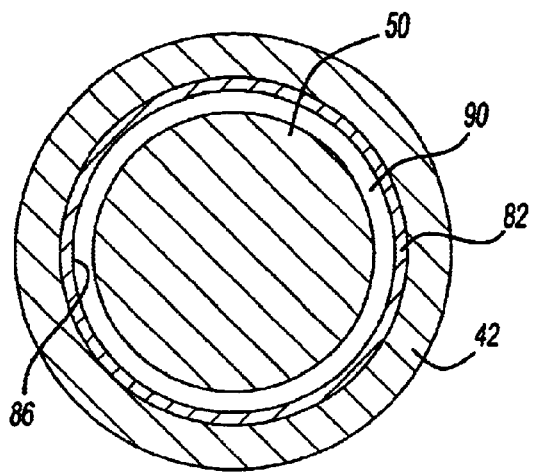
FIG. 4 is a cross-section taken along lines 4—4 in FIG. 2.
Figure 5:
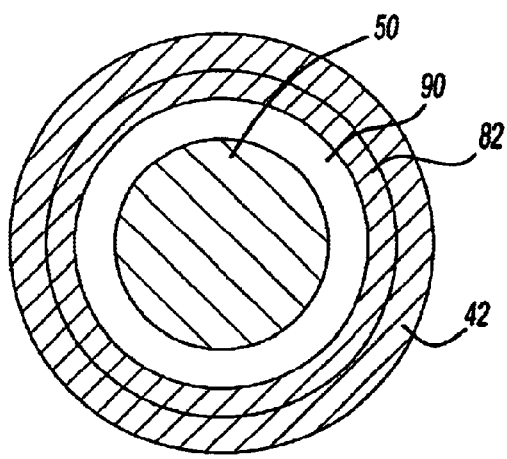
FIG. 5 is a cross-section of an alternate embodiment of the invention.

When the sleeve 82 is installed within the bore 52, as shown in FIG. 4, the outer surface 88 is engaged against the bore 52 of the spindle 42. The inner surface 86 of the sleeve 82 is spaced apart from the axle shaft 50 to form a gap 90. This gap 90 forms a portion of the vent path 76.

As shown in FIG. 2, the sleeve 82 extends beyond the end of the spindle 42 such that the outer surface 88 blocks at least a portion of the fluid path 58. The length that the sleeve 82 extends beyond the spindle 42 can vary depending upon vehicle application and wheel end gear assembly configuration. The sleeve 82 allows air to be vented along the vent path 58 via gap 90 but limits or reduces the amount of fluid that enters the vent path 58.

The subject invention provides a wheel end assembly for a vehicle that allows air to be easily vented from the wheel end while reducing venting of lubricating fluid. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle wheel end assembly comprising:
   a non-rotating wheel component defining an inner bore;
   a rotating wheel component supported on at least one bearing for rotation relative to said non-rotating wheel component;
   a driven member operably coupled to said rotating wheel component;
   a drive member positioned within said inner bore and in driving engagement with said driven member;
   a chamber defined within said rotating wheel component, said chamber being at least partially filled with a lubricating fluid and defining a fluid path in communication with said driven member;
   a vent path extending through said inner bore between said drive member and said non-rotating wheel component; and
   a blocking member supported by said non-rotating wheel component to at least partially block said fluid path to allow air pressure build-up within said rotating wheel component to be vented through said vent path while reducing the amount of said lubricating fluid that enters said vent path.

2. An assembly according to claim 1 wherein said blocking member comprises a cylindrical sleeve concentric with said non-rotating wheel component.

3. An assembly according to claim 2 wherein said sleeve includes an outer surface in engagement with said inner bore and an inner surface spaced apart from said drive member to define a portion of said vent path.

4. An assembly according to claim 3 wherein said non-rotating component includes an end face defining a mouth of said inner bore and wherein said sleeve extends outwardly beyond said end face such that a portion of said outer surface is exposed to block said fluid path.

5. An assembly according to claim 3 wherein said non-rotating wheel component comprises a spindle mounted to an axle housing and said rotating wheel component comprises a hub mounted for rotation relative to said spindle.

6. An assembly according to claim 5 wherein said vent path vents air through an outlet to said axle housing.

7. An assembly according to claim 5 wherein said driven member is a wheel end gear assembly and said drive member is an axle shaft coupled to said gear assembly.

8. A vehicle wheel end assembly comprising:
   a wheel hub;
   a wheel end gear assembly operably coupled to said wheel hub to rotate said wheel hub about an axis of rotation;
   a fluid chamber formed within said wheel hub, said chamber being at least partially filled with a lubricating fluid and defining a fluid path in communication with said wheel end gear assembly;
   a vent path extending from said wheel end gear assembly and through said wheel hub to an outlet for venting air from the wheel end assembly resulting from air pressure build-up during vehicle operation; and
   a blocking member positioned within said wheel hub to at least partially block said fluid path to reduce the amount of said lubricating fluid that enters said vent path as air is vented from said vent path through said outlet.

9. An assembly according to claim 8 including a spindle mounted to a non-rotating vehicle structure wherein said wheel hub is supported on said spindle with at least one bearing wherein a portion of said vent path extends through said spindle.

10. An assembly according to claim 9 including an axle shaft coupled to said wheel end gear assembly to provide driving torque to said wheel hub wherein said axle shaft extends through a bore formed within said spindle.

11. An assembly according to claim 10 wherein said blocking member comprises a cylindrical sleeve supported by said spindle such that said axle shaft extends through said sleeve.

12. An assembly according to claim 11 wherein said sleeve includes an outer surface in engagement with a portion of said bore and an inner surface spaced apart from said axle shaft to define a gap that forms a portion of said vent path.

13. An assembly according to claim 12 wherein said sleeve extends outwardly from one end of said spindle such that a portion of said outer surface blocks fluid in said fluid path from entering said vent path.

14. As assembly according to claim 10 wherein said blocking member is integrally formed with said spindle as one piece.

15. A vehicle wheel end assembly comprising:
   a spindle mounted to an axle housing and including a bore extending through the length of said spindle;
   a hub supported on said spindle by at least one bearing for rotation relative to said spindle;
   an axle shaft mounted within said bore for providing driving torque to said hub;
   a gear assembly reacting between said hub and said axle shaft to transfer driving torque from said axle shaft to said hub;
   a fluid path defined within said hub for supplying a lubricating fluid to said gear assembly;
   a vent path defined within said hub and extending at least from said gear assembly through said bore to an outlet; and
   a sleeve extending outwardly from one end of said spindle to at least partially block said fluid path to reduce the amount of said lubricating fluid that enters said vent path as air is vented from said outlet.

16. An assembly according to claim 15 wherein air is vented through said outlet to said axle housing.

17. An assembly according to claim 15 wherein said sleeve includes a cylindrical body defining an inner surface and an outer surface with said cylindrical body being mounted within said bore such that said outer surface engages said bore with said axle shaft extending through said sleeve such that a gap is formed between said axle shaft and said inner surface to define a portion of said vent path.

18. An assembly according to claim 8 including a non-rotating wheel component having an inner bore that surrounds a drive member operably coupled to drive said wheel end gear assembly wherein a portion of said vent path extends through said inner bore.

19. An assembly according to claim 18 wherein said blocking member is at least partially received within said inner bore.

20. An assembly according to claim 15 wherein said sleeve cooperates with said bore to form a portion of said vent path.

* * * * *